(12) United States Patent
McKay

(10) Patent No.: US 11,871,692 B2
(45) Date of Patent: Jan. 16, 2024

(54) ENCAPSULATED SEED AND METHOD FOR MAKING SAME

(71) Applicant: Talby McKay, Spruce Grove (CA)

(72) Inventor: Talby McKay, Spruce Grove (CA)

( * ) Notice: Subject to any disclaimer, the term of this patent is extended or adjusted under 35 U.S.C. 154(b) by 0 days.

(21) Appl. No.: 17/469,859

(22) Filed: Sep. 8, 2021

(65) Prior Publication Data

US 2022/0071083 A1 Mar. 10, 2022

Related U.S. Application Data

(60) Provisional application No. 63/076,162, filed on Sep. 9, 2020.

(51) Int. Cl.
*A01C 1/06* (2006.01)
*A01G 24/40* (2018.01)
*A01G 24/12* (2018.01)

(52) U.S. Cl.
CPC .............. *A01C 1/06* (2013.01); *A01G 24/12* (2018.02); *A01G 24/40* (2018.02)

(58) Field of Classification Search
CPC .......... A01C 1/06; A01G 24/12; A01G 24/40
See application file for complete search history.

(56) References Cited

U.S. PATENT DOCUMENTS

| PP31,535 P3 | * | 3/2020 | Lewis | A01H 6/28 Plt./258 |
| 2012/0204294 A1 | * | 8/2012 | Schafer | A01H 3/00 800/312 |
| 2017/0022117 A1 | * | 1/2017 | Traxler | C09K 17/04 |
| 2020/0015410 A1 | * | 1/2020 | Krysiak | C05G 5/12 |

FOREIGN PATENT DOCUMENTS

| CN | 106258084 A | * | 1/2017 |
| CN | 110839650 A | * | 2/2020 |

OTHER PUBLICATIONS

Google patent translation for CN106258084A, 8 pp. (Year: 2023).*
Google patent translation for CN110839650A, 10 pp. (Year: 2023).*
Gumball retrieved on Feb. 14, 2023 at https://www.gumball.com/pages/gumball-sizes, 3 pp. (Year: 2023).*
Maeckle Happy Winter Solstice! Celebrate with Seedballs, a Recipe, and Step-by-Step Directions on How to Make them 2011, retrieved on 2023 at https://texasbutterflyranch.com/2011/12/20/happy-winter-solstice-celebrate-with-seedballs-a-recipe-and-step-by-step-directions-on-how-to-make-them/, 8 pp. (Year: 2011).*

* cited by examiner

*Primary Examiner* — June Hwu
(74) *Attorney, Agent, or Firm* — FOLEY & LARDNER LLP

(57) ABSTRACT

A seed ball for use in reforestation and horticulture, the seed ball comprising a seed encapsulated within a seed encapsulant, comprising soil, clay and biochar. Apparatus for making the seed ball include a roller mill and a press mill.

12 Claims, 6 Drawing Sheets

ENCAPSULATED SEED AND METHOD FOR MAKING SAME

CROSS-REFERENCE TO RELATED APPLICATIONS

This application claims priority of U.S. Provisional Patent Application Ser. No. 63/076,162 filed Sep. 9, 2020, which is incorporated by reference into this application in its entirety.

TECHNICAL FIELD

The present disclosure is related to the field of reforestation and horticulture, in particular, encapsulated seed balls for reforestation and horticulture.

BACKGROUND

When reforesting regions, it can be a challenge to effectively re-seed the region. There is also a need for enhancing the growth of newly planted seeds so that the plant will grow faster and stronger in addition to decreasing the time to re-plant a region and to increase the amount of region that can be re-seeded.

It is, therefore, desirable to provide an encapsulated seed that addresses these needs and a method for making same.

SUMMARY

For the purposes of this specification and the claims that follow, the term "about", when used with respect to an indicated value of a unit of measure or relative proportion, is defined as plus or minus 20% of the indicated value.

Broadly stated, in some embodiments, a seed ball can be provided, wherein the seed ball can comprise a seed, and a seed encapsulant that can further comprise a mixture of one or more of soil, clay and biochar.

Broadly stated, in some embodiments, the seed encapsulant can be prepared by mixing the following parts by weight: about three parts to about five parts soil; about two parts to about three parts clay; about ¾ of a part to about one part biochar; and about ¾ of a part to about one part water.

Broadly stated, in some embodiments, the parts by weight can be: about five parts soil; about three parts clay; about one part biochar; and about one part water.

Broadly stated, in some embodiments, the clay can have a moisture content that is about 10% to about 15%.

Broadly stated, in some embodiments, the biochar can have a maximum particle size that is less than or equal to about 26 mesh. The biochar can have a maximum particle size that is less than or equal to about 50 mesh.

Broadly stated, in some embodiments, the clay can include one or more of bentonite, montmorillonite and red clay. The soil can include one or more of black soil, sandy loam and peat moss.

Broadly stated, in some embodiments, the seed ball can be a spheroid or a triangular pyramid. The seed ball can be substantially spherical and can have a diameter of about 19 millimeters ("mm") to about 63.5 mm. In some embodiments, the diameter of the seed ball can be about 38 mm.

Broadly stated, in some embodiments, the seed can be a pine seed, spruce seed, Douglas fir seed, cedar seed or hemp seed.

Broadly stated, in some embodiments, a method can be provided for the production of a seed ball, the method comprising: locating a seed within a quantity of encapsulant material comprising soil, clay and biochar; compacting the encapsulant material about the seed to form a desired shape of the compacted encapsulant material; and chilling the desired shape of the compacted encapsulant material.

Broadly stated, in some embodiments, the method can include providing the encapsulant material by mixing the following parts by weight: about three parts to about five parts soil; about two parts to about three parts clay; about ¾ of a part to about one part biochar; and about ¾ of a part to about one part water.

Broadly stated, in some embodiments, the method can include providing the encapsulant material by mixing the following parts by weight: about five parts soil; about three parts clay; about one part biochar; and about one part water.

Broadly stated, in some embodiments, the desired shape of the compacted encapsulant material can be substantially spherical and have a diameter of about 19 mm to about 63.5 mm.

Broadly stated, in some embodiments, chilling the desired shape of the compacted encapsulant material can include providing a liquid nitrogen quench.

Broadly stated, in some embodiments, the method can include storing the seed ball at a temperature between about 12 degrees Celsius and about 15 degrees Celsius.

Broadly stated, in some embodiments, the step of compacting the encapsulant material about the seed to form the desired shape can be performed by a roller mill or a press mill.

Broadly stated, in some embodiments, a seed ball can be provided, the seed ball comprising: a seed; and a seed encapsulant encapsulating the seed, wherein the seed encapsulant can be prepared by mixing the following parts by weight: about five parts soil; about three parts clay, wherein the clay has a moisture content that is about 10% to about 15%, and wherein the clay includes one or more of bentonite, montmorillonite and red clay; about one part biochar, wherein the biochar can have a maximum particle size that is less than or equal to about 26 mesh; and about one part water; and wherein the seed ball can be substantially spherical and have a diameter of about 19 mm to about 63.5 mm.

DETAILED DESCRIPTION OF EMBODIMENTS

Figure 1:
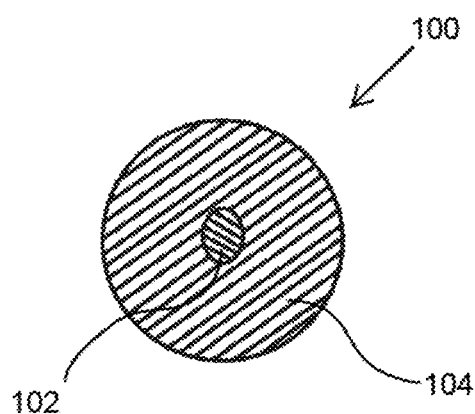
FIG. 1 is a side elevation cross-section view depicting one embodiment of a seed ball.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

As shown in the Figures, embodiments of seed ball 100 are shown, wherein seed ball 100 can comprise seed 102 contained therein with encapsulant 104, encapsulant 104 further comprising a mixture of soil, clay, biochar and water.

Seed 102 can be for any desired plant species. For example, for reforestation purposes, the seed can be for a pine, spruce, Douglas fir, cedar or any other marketable tree species. In some embodiments, seed ball 100 can be prepared for plants that are typically planted in spaced apart arrays so as to have sufficient space for the usual growth pattern of the plant (e.g. spreading plants such as *cannabis*, hemp etc.). Thus, each seed ball 100 can generally contain a single seed 102 although, in other embodiments, seed ball 100 can comprise more than one seed 102 for plant species that commonly or desirably grow in closely spaced clusters, or to increase the likelihood of germination if the seed supply varies in quality such that a portion of the seeds cannot be expected to reliably germinate.

In some embodiments, the soil can be any soil (or blend of soils) suitable for the plant to be grown from seed 102. Some examples can comprise black soil, sandy loam, peat moss and blends of these. The soil can contain organic matter (e.g., dead plant matter) and need not be processed or cleaned. In some embodiments, the soil is not contaminated with foreign debris such as plastic, metal, construction waste, demolition waste, hydrocarbons, chemicals and other foreign substances or material detrimental to plant growth as well known by those skilled in the art.

In some embodiments, the clay can comprise a Bentonite mixture with a high percentage of Montmorillonite (a natural mineral silicate) with a 10-15% moisture content at the time of mixing. Other clays and blends of clays (e.g., a red clay/bentonite mixture) can be suitable. In some embodiments, a clay or blend of clays can be suitable if it: exhibits appropriate plasticity and adhesion qualities when mixed with water in the preferred proportions; achieves a desired firmness as the outer periphery of the seed ball 100 dries; and is relatively impermeable to water.

Biochar (also known as biocarbon) is a high-carbon, fine-grained residue generally produced through modern pyrolysis processes; it is the direct thermal decomposition of biomass in the absence of oxygen (preventing combustion). Biochar is understood to offer benefits for soil health. Biochar can be extremely porous and can be effective at retaining both water and water-soluble nutrients. Biochar can increase soil fertility of acidic soils (low pH soils), increase agricultural productivity and provide protection against some foliar and soil-borne diseases.

In some embodiments, sources of suitable biochar are Northern Biocarbon Processing Ltd. and Biochar Now, LLC, which produces a biochar product that is U.S. Department of Agriculture (USDA) approved, Canadian Food Inspection Agency (CFIA) approved and Organic Materials Review Institute (OMRI) approved, and which is produced using a process that meets U.S. Environmental Protection Agency (US EPA) standards and regulations.

When the biochar conversion process is finished, the raw biochar pieces are generally too large for practical use so, typically, they are crushed and screened to produce different particle sizes for different uses. For use as a constituent of seedball 100, a biochar "powder" (e.g., 50 mesh and smaller) is most desirable. However, a "small" size biochar particle (e.g., 26 mesh to 50 mesh) can be suitable.

In some embodiments, the proportions by weight of the components mixed together to create encapsulant 104 material can comprise: 1 part biochar; 3 parts clay; 5 parts soil; and 1 part water. It is understood that the following ranges of proportions by weight of the components can also produce useable encapsulant 104 materials: soil—low 3 parts-high 5 parts; clay—low 2 parts—high 3 parts; biochar—low ¾ parts—high 1 part; and water—low ¾ parts-high 1 part.

In some embodiments, seed ball 100 can be generally spherical and can comprise a diameter of about 38 mm. The diameter of seed ball 100 should be sufficient to completely encapsulate seed 102 and can range from about 19 mm to about 63.5 mm. In some embodiments, a generally spherical shape of seed ball 100 can provide the smallest surface area per volume, which can be desirable in terms of preserving some moisture in seed ball 100.

In some embodiments, shapes other than generally spherical for seed ball 100 can be desirable in some circumstances. For example, if it is known that seed ball 100 will be used on steep terrain, a shape configured to prevent seed ball 100 from rolling (e.g., a spheroid (preferably an oblate spheroid) or having projections or generally planar surfaces) can be used. In some embodiments, if it is desirable to maximize surface area contact between seed ball 100 and the underlying soil (e.g., to draw moisture into seed ball 100), seed ball 100 can comprise a tetrahedron (triangular pyramid) configuration or shape.

Test batches of encapsulant 104 material were produced by hand mixing (e.g., in a bucket using a trowel). It is understood that encapsulant 104 material can be produced on a commercial scale using equipment and techniques akin to those used in concrete batching and mixing.

In some embodiments, the seed balls can be formed by a variety of methods (including manually) and apparatuses.

Figure 2:
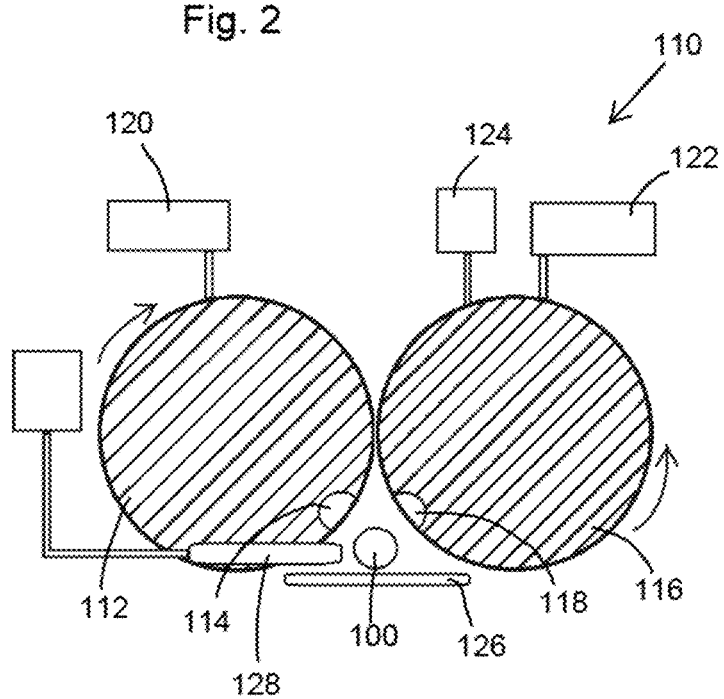
FIG. 2 is a side elevation view depicting a roller mill apparatus for making seed balls.

In some embodiments, roller mill 110 can be use for making seed balls 100, as illustrated in FIG. 2. In some embodiments, roller mill 110 can comprise: left roller 112 having at least one left roller concavity 114; right roller 116 having at least one right roller concavity 118; left encapsulant material feed 120; right encapsulant material feed 122; seed feed 124; conveyor 126; and cooling device 128.

In some embodiments, left roller 112 and right roller 116 can rotate in opposite directions to each other so as to bring left roller concavity 114 and right roller concavity 118 into periodic repeating alignment with each other.

As left roller 112 and right roller 116 rotate: left encapsulant material feed 120 can be configured and positioned to deposit a quantity of encapsulant 104 material into left roller concavity 114; right encapsulant material feed 122 can be configured and positioned to deposit a quantity of encapsulant 104 material into right roller concavity 118; and seed feed 124 can be configured and positioned to place one or more of seed 102 in the quantity of encapsulant 104 material in right roller concavity 118. Then, as left roller concavity 114 and right roller concavity 118 come into alignment, encapsulant 104 material in concavities 114 and 118 can be pressed together with seed 102 therebetween, forming seed ball 100. Seed ball 100 can then fall onto conveyor 126 as the rotation of left roller 112 and right roller 116 brings concavities 114 and 118 out of alignment.

In some embodiments, the newly formed seed ball 100 can be relatively fragile. Cooling device 128 (e.g., a liquid nitrogen quench, or similar) can rapidly chill the exterior of seed ball 100 and can help to stabilize the desired shape of the seed ball. In some embodiments, it can be also desirable to minimize the fall distance of seed ball 100. For example, in some embodiments, this can be accomplished by orienting the direction of travel of conveyor 126 to be parallel to the axes of rotation of left roller 112 and right roller 116.

In some embodiments, the compaction/density of seed ball 100 produced by roller mill 110 can be adjusted by altering the quantity of encapsulant 104 material deposited in one or both of left roller concavity 114 and right roller concavity 118.

Figure 3:
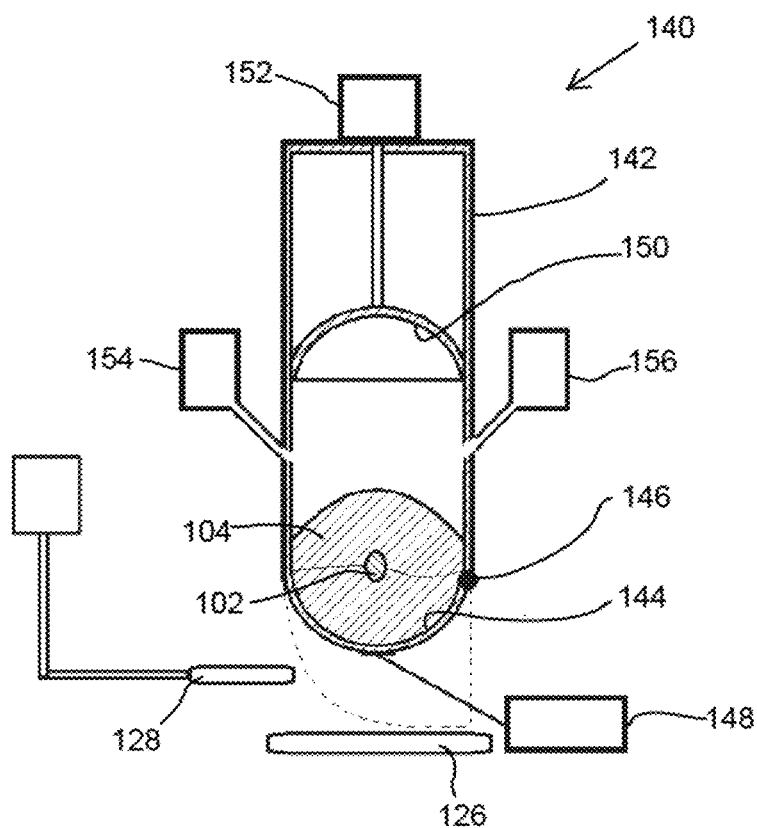
FIG. 3 is a side elevation cross-section view depicting a press mill apparatus for making seed balls.

In some embodiments, press mill 140 can be used for making seed balls 100, as illustrated in FIG. 3. In some embodiments, press mill 140 can comprise: press mill body 142; lower concavity 144; hinge 146 (hingedly connecting lower concavity 144 to press mill body 144); lower concavity actuator 148; upper concavity 150; upper concavity actuator 152; seed injector 154; encapsulant material supplier 156; conveyor 126; and cooling device 128.

In some embodiments, lower concavity 144 can be pivotable by lower concavity actuator 148 between the closed position shown in solid lines in FIG. 3, and the open position indicated by dashed lines in FIG. 3. In some embodiments, upper concavity 150 can be linearly movable by upper concavity actuator 152 between the top position indicated in FIG. 3 and a compaction position (not illustrated).

With lower concavity 144 in the closed position, a first quantity of encapsulant 104 material can be deposited in lower concavity 144 by encapsulant material supplier 156, then one or more of seed 102 can be deposited on the first quantity of encapsulant 104 material by seed injector 154, then a second quantity of encapsulant 104 material can be deposited by encapsulant material supplier 156, then upper concavity 150 can be moved to the compaction position, then lower concavity 144 can be moved to the open position permitting the thus-formed seed ball 100 to fall onto conveyor 126, and then, preparatory to producing another seed ball 100, lower concavity 144 can be moved to the closed position and upper concavity 150 can be moved to the top position.

As with roller mill 110, cooling device 128 can be implemented with press mill 140 to rapidly chills the exterior of seed ball 100, helping to stabilize the desired shape of seed ball 100, and the fall distance to conveyor 126 can be desirably minimized.

In some embodiments, the compaction/density of seed ball 100 produced by press mill 140 can be adjusted by altering one or both of the first and second quantities of encapsulant 104 material.

In some embodiments, to impede premature germination, seed balls 100 can be stored at a temperature between about 12 degrees Celsius and about 15 degrees Celsius prior to use. The inventor understands that seed balls 100 can be stored for at least three or four months within this temperature range with little discernable effect on efficacy.

Figure 4:
FIG. 4 is a photograph depicting three seed balls planted at different depths.
Figure 5:
FIG. 5 is a photograph depicting a single seed ball.

In some embodiments, some drying of seed ball 100 is usually necessary to achieve a desired surface hardness. Once a desired surface hardness has been achieved, a seed ball 100 can be positioned by planting it at or beneath the surface (as illustrated in FIG. 4), or by dropping it on the surface, e.g., by ejecting it from a gun or dropping it from the air.

Figure 6:
FIG. 6 is a photograph depicting a pine tree growing from a seed in a seed ball, after 6 days of germination.

Once seed ball 100 is at a suitable temperature, seed 102 within seed ball 100 can start to germinate and grow. The biochar/biocarbon contained within seed ball 100 can enhance plant growth and enhance the root system's penetration and adherence to the adjacent soil. FIG. 6 is a photograph of a pine tree growing from a seed ball after 6 days of germination.

Applicant understands that the seed ball embodiment described herein can be user friendly for horticulture (including marijuana cultivation), can be quicker and faster per cycle, and can enhance soils for continual use.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:
1. A method for the production of a seed ball, the method comprising:
   a. locating a seed within a quantity of encapsulant material comprising soil, clay and biochar, wherein the seed encapsulant is prepared by mixing the following parts by weight:
      i. about five parts soil,
      ii. about three parts clay, wherein the clay has a moisture content that is about 10% to about 15%, and wherein the clay comprises one or more of bentonite, montmorillonite and red clay,
      iii. about one part biochar, wherein the biochar has a maximum particle size that is less than or equal to about 26 mesh, and
      iv. about one part water;
   b. compacting the encapsulant material about the seed to form a desired shape of the seed ball, wherein the seed ball comprises a diameter of about 19 mm to about 63.5 mm; and
   c. stabilizing the desired shape of the seed ball by quenching the seed ball in liquid nitrogen.

2. The method as set forth in claim 1, further comprising storing the seed ball at a temperature between about 12 degrees Celsius and about 15 degrees Celsius.

3. The method as set forth in claim 1, wherein the step of compacting the encapsulant material about the seed comprises forming the desired shape with a roller mill or a press mill.

4. A seed ball, comprising:
   a. seed;
   b. a seed encapsulant encapsulating the seed, wherein the seed encapsulant is prepared by mixing the following parts by weight:
      i. about five parts soil;
      ii. about three parts clay, wherein the clay has a moisture content that is about 10% to about 15%, and wherein the clay comprises one or more of bentonite, montmorillonite and red clay;
      iii. about one part biochar, wherein the biochar has a maximum particle size that is less than or equal to about 26 mesh; and
      iv. about one part water;
   c. wherein the seed ball comprises a diameter of about 19 mm to about 63.5 mm; and
   d. wherein a desired shape of the seed ball is stabilized by quenching the seed ball in liquid nitrogen.

5. The seed ball as set forth in claim 4, wherein the soil comprises one or more of black soil, sandy loam and peat moss.

6. The seed ball as set forth in claim 4, wherein the seed ball is a spheroid or a triangular pyramid.

7. The seed ball as set forth in claim 6, wherein the diameter is about 38 mm.

8. The seed ball as set forth in claim 4, wherein the seed is pine seed, spruce seed, Douglas fir seed, cedar seed or hemp seed.

9. The method as set forth in claim 1, wherein the soil comprises one or more of black soil, sandy loam and peat moss.

10. The method as set forth in claim 1, wherein the seed ball is a spheroid or a triangular pyramid.

11. The method as set forth in claim 10, wherein the diameter is about 38 mm.

12. The method as set forth in claim 1, wherein the seed is pine seed, spruce seed, Douglas fir seed, cedar seed or hemp seed.

\* \* \* \* \*